United States Patent
Shimamura et al.

(10) Patent No.: US 11,222,525 B2
(45) Date of Patent: Jan. 11, 2022

(54) ARTICLE MANAGEMENT SYSTEM AND METHOD

(71) Applicant: Nippon Telegraph and Telephone Corporation, Tokyo (JP)

(72) Inventors: Toshishige Shimamura, Tokyo (JP); Yuichi Okabe, Tokyo (JP); Tsuyoshi Yamamoto, Tokyo (JP); Yuzo Ishii, Tokyo (JP)

(73) Assignee: Nippon Telepgraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/252,660

(22) PCT Filed: May 23, 2019

(86) PCT No.: PCT/JP2019/020472
§ 371 (c)(1),
(2) Date: Dec. 15, 2020

(87) PCT Pub. No.: WO2019/244556
PCT Pub. Date: Dec. 26, 2019

(65) Prior Publication Data
US 2021/0217299 A1    Jul. 15, 2021

(30) Foreign Application Priority Data

Jun. 20, 2018 (JP) .............................. JP2018-116769

(51) Int. Cl.
*G08C 17/02* (2006.01)
*G08B 21/24* (2006.01)

(52) U.S. Cl.
CPC .............. *G08C 17/02* (2013.01); *G08B 21/24* (2013.01)

(58) Field of Classification Search
CPC ........ G08B 13/24; G08B 21/24; G08C 17/02; H04M 11/00; H04M 1/00
See application file for complete search history.

(56) References Cited

U.S. PATENT DOCUMENTS

| 2012/0218103 A1* | 8/2012 | Alves ..................... G08B 21/24 340/539.32 |
| 2014/0089243 A1* | 3/2014 | Oppenheimer ......... G06F 21/88 706/46 |

FOREIGN PATENT DOCUMENTS

JP          2002109657 A      4/2002

* cited by examiner

*Primary Examiner* — Omeed Alizada
(74) *Attorney, Agent, or Firm* — Slater Matsil, LLP

(57) ABSTRACT

Each first terminal mounted in advance on an item transmits first vibration data and a first terminal ID by radio wave in response to vibration detection, each beacon terminal disposed in advance at a place in a room intermittently transmits a beacon signal and a beacon ID by radio wave, a management device sequentially records each first terminal ID received together with the first vibration data and the beacon ID received together with the beacon signal to a detection list in a storage unit, acquires, from the storage unit, terminal information related to the first terminal ID recorded in the detection list and position information related to the beacon ID received concurrently with the first terminal ID, and displays the terminal information and the position information on a screen.

13 Claims, 10 Drawing Sheets

| ID | RECEPTION TIME |
|---|---|
| 0001 | 7:30 |
| 0002 | 7:30 |
| 1001 | 7:30 |
| ⋮ | ⋮ |

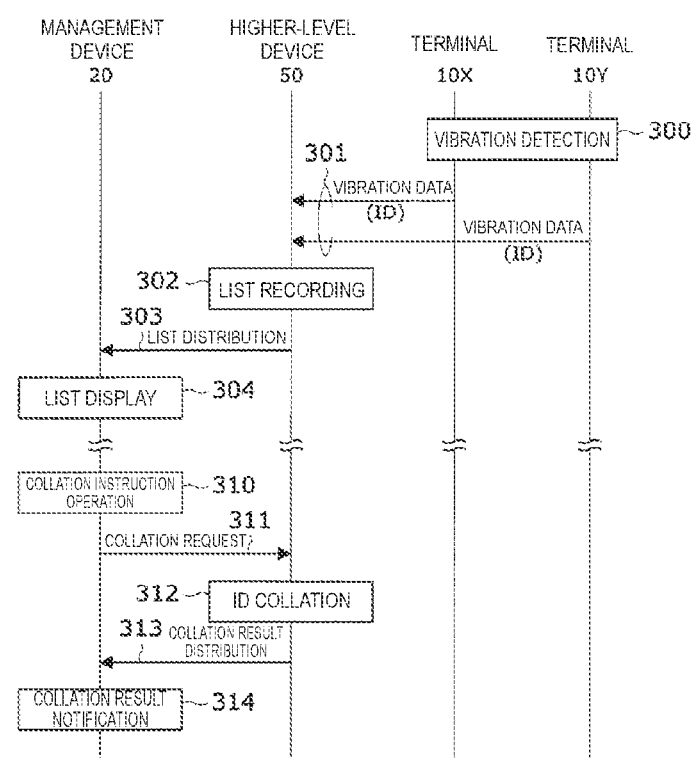

ARTICLE MANAGEMENT SYSTEM AND METHOD

CROSS-REFERENCE TO RELATED APPLICATIONS

This patent application is a national phase filing under section 371 of PCT/JP2019/020472, filed May 23, 2019, which claims the priority of Japanese patent application 2018-116769, filed Jun. 20, 2018, each of which is incorporated herein by reference in its entirety.

TECHNICAL FIELD

The present invention relates to an item management technology of managing items based on terminal IDs transmitted from a plurality of terminals mounted in advance on the items.

BACKGROUND

In a conventionally disclosed technology with which a user searches for items such as brought items, a small-sized terminal configured to output sound or light in response to infrared is mounted on each item, and when an item, the location of which is unknown is searched for, infrared is transmitted from a remote controller so that the location of the item is searched for based on sound or light output from the terminal in response to the infrared (refer to Patent Literature 1, for example).

CITATION LIST

Patent Literature

Patent Literature 1: Japanese Patent Laid-open No. 2002-109657

SUMMARY

Technical Problem

However, with such a conventional technology, since sound or light is output from the terminal in response to detection of infrared from the remote controller, search can be performed only within a range that the infrared can reach, and thus the terminal being present at a hidden place such as a drawer or a cupboard cannot be found.

Embodiments of the present invention are intended to solve such a problem and provide an item management technology with which an item at a hidden place can be easily found.

Means for Solving the Problem

To achieve the above-described intention, an item management system according to embodiments of the present invention includes: a plurality of first terminals each mounted in advance on an item as a management target and each configured to transmit a first terminal ID for identifying the first terminal by radio wave when vibration is detected by a built-in acceleration sensor; a plurality of beacon terminals each disposed in advance at a place in a room in which the item is present and each configured to intermittently transmit a beacon ID for identifying the beacon terminal by radio wave; and a management device that includes a storage unit configured to store terminal information related to each first terminal ID and position information related to each beacon ID, sequentially record each first terminal ID received and a reception time of the received first terminal ID to a detection list in the storage unit, sequentially record each beacon ID received and a reception time of the received beacon ID to the detection list, acquire, from the storage unit, the terminal information related to the first terminal ID recorded in the detection list and the position information related to the beacon ID received concurrently with the first terminal ID, and display the terminal information and the position information on a screen.

Another item management system according to embodiments of the present invention includes: a plurality of first terminals each mounted in advance on an item as a management target and each configured to transmit a first terminal ID for identifying the first terminal by radio wave when vibration is detected by a built-in acceleration sensor; a plurality of second terminals each mounted in advance on an object in a room in which the item is present and each configured to transmit a second terminal ID for identifying the second terminal by radio wave when vibration is detected by a built-in acceleration sensor; and a management device that includes a storage unit configured to store in advance terminal information related to the first terminal ID and position information related to the second terminal ID, sequentially record each first terminal ID received and a reception time of the received first terminal ID to a detection list in the storage unit, sequentially record each second terminal ID received and a reception time of the received second terminal ID to the detection list, acquire, from the storage unit, the terminal information related to the first terminal ID recorded in the detection list and the position information related to the second terminal ID received concurrently with the first terminal ID, and display the terminal information and the position information on a screen.

In an exemplary configuration of the above-described item management system according to embodiments of the present invention, the plurality of first terminals each transmit first vibration data representing the vibration by radio wave in a duration in which the vibration is detected; the plurality of second terminals each transmit second vibration data representing the vibration by radio wave in a duration in which the vibration is detected; and at recording of the first and second terminal IDs, the management device compares a first detection duration in which vibration is detected according to the first vibration data and a second detection duration in which vibration is detected according to the second vibration data, and determines whether recording of the first and second terminal IDs to the detection list is permitted based on the length of an overlap duration in which the first and second detection durations overlap each other or the frequency of detection of the overlap duration.

In another exemplary configuration of the above-described item management system according to embodiments of the present invention, at recording of the first and second terminal IDs, the management device records the received first and second terminal IDs to the detection list only when the first and second terminal IDs are received until a record permission duration of a certain length elapses since it is checked that the length of the overlap duration has reached a determination duration set in advance.

Another item management system according to embodiments of the present invention includes: a plurality of first terminals each mounted in advance on an item as a management target and each configured to transmit a first terminal ID for identifying the first terminal by radio wave when vibration is detected by a built-in acceleration sensor; a plurality of second terminals each mounted in advance on an object in a room in which the item is present and each configured to transmit a second terminal ID for identifying the second terminal by radio wave when vibration is detected by a built-in acceleration sensor; a higher-level device that includes a storage unit configured to store in advance terminal information related to the first terminal ID and position information related to the second terminal ID, sequentially record each first terminal ID received, a reception time of the received first terminal ID, and the terminal information related to the first terminal ID to a detection list in the storage unit, and sequentially record each second terminal ID received, a reception time of the received second terminal ID, and the position information related to the second terminal ID to the detection list; and a management device configured to acquire, from the higher-level device, a location list including the terminal information related to the first terminal ID recorded in the detection list and the position information related to the second terminal ID received concurrently with the first terminal ID and display the location list on a screen.

In another exemplary configuration of the above-described item management system according to embodiments of the present invention, the plurality of first terminals each transmit first vibration data representing the vibration by radio wave in a duration in which the vibration is detected; the plurality of second terminals each transmit second vibration data representing the vibration by radio wave in a duration in which the vibration is detected; and at recording of the first and second terminal IDs, the higher-level device compares a first detection duration in which vibration is detected according to the first vibration data and a second detection duration in which vibration is detected according to the second vibration data, and determine whether recording of the first and second terminal IDs to the detection list is permitted based on the length of an overlap duration in which the first and second detection durations overlap each other or the frequency of detection of the overlap duration.

In another exemplary configuration of the above-described item management system according to embodiments of the present invention, the management device transmits a collation request related to the detection list to the higher-level device in response to a collation instruction input through an operation and gives notification of a collation result as information provided from the higher-level device in response to the collation request in a visible, audible, or vibrating manner; and the higher-level device collates a first terminal ID included in the detection list and a first terminal ID included in a check list stored in the storage unit in response to the collation request from the management device and provides information of an obtained collation result to the management device, and when performing the collation, the higher-level device searches past detection lists stored in the storage unit for a detection list corresponding to date and time or day of week of the detection list and generates the check list from a first terminal ID, a record rate of which is a probability equal to or higher than a predetermined value among first terminal IDs recorded in the obtained detection list.

In another exemplary configuration of the above-described item management system according to embodiments of the present invention, a wireless relay device configured to accommodate the plurality of terminals and the management device through wireless lines and perform relay connection of the plurality of terminals and the management device to the higher-level device is further included; the wireless relay device measures a standard time synchronized with a time management server, and when relay-forwarding the first and second terminal IDs to the higher-level device, the wireless relay device notifies the higher-level device of the standard time at the relay-forwarding as the reception times of the first and second terminal IDs; and at recording of the first and second terminal IDs, the higher-level device records, to the detection list, the reception times of the first and second terminal IDs and notified by the wireless relay device.

In another exemplary configuration of the above-described item management system according to embodiments of the present invention, the wireless relay device includes a parent device and a child device connected with each other through a wireless relay line; the child device accommodates the first and second terminals or the management device and relay-connects the first and second terminals or the management device to the parent device through the wireless relay line; the parent device relay-connects, to the higher-level device, the first and second terminals or the management device relay-connected through the child device, and when notifying the higher-level device of the reception times, the parent device corrects the reception times based on a delay time through the wireless relay line, which is obtained through measurement in advance, and then notifies the higher-level device of the corrected reception times.

An item management system according to embodiments of the present invention is used by an item management system in which a management device manages items based on terminal IDs transmitted from a plurality of terminals mounted in advance on the items, and includes: a step in which a plurality of first terminals among the plurality of terminals are each mounted in advance on an item as a management target and each transmit a first terminal ID for identifying the first terminal by radio wave when vibration is detected by a built-in acceleration sensor; a step in which a plurality of beacon terminals each disposed in advance at a place in a room in which the item is present and each intermittently transmit a beacon ID for identifying the beacon terminal by radio wave; and a step in which the management device includes a storage unit configured to store terminal information related to each first terminal ID and position information related to each beacon ID, sequentially record each first terminal ID received and a reception time of the received first terminal ID to a detection list in the storage unit, sequentially record each beacon ID received and a reception time of the received beacon ID to the detection list, acquire, from the storage unit, the terminal information related to the first terminal ID recorded in the detection list and the position information related to the beacon ID received concurrently with the first terminal ID, and display the terminal information and the position information on a screen.

Another item management system according to embodiments of the present invention is used by an item management system in which a management device manages items based on terminal IDs transmitted from a plurality of terminals mounted in advance on the items, and includes: a step in which a plurality of first terminals among the plurality of terminals are each mounted in advance on an item as a management target and each transmit a first terminal ID for identifying the first terminal by radio wave when vibration is detected by a built-in acceleration sensor; a step in which a plurality of second terminals among the plurality of terminals are each mounted in advance on an object in a room in which the item is present and each transmit a second terminal ID for identifying the second terminal by radio wave when vibration is detected by a built-in acceleration sensor; and a step in which the management device includes a storage unit configured to store in advance terminal information related to the first terminal ID and position information related to the second terminal ID, sequentially record each first terminal ID received and a reception time of the received first terminal ID to a detection list in the storage unit, sequentially record each second terminal ID received and a reception time of the received second terminal ID to the detection list, acquire, from the storage unit, the terminal information related to the first terminal ID recorded in the detection list and the position information related to the second terminal ID received concurrently with the first terminal ID, and display the terminal information and the position information on a screen.

Another item management system according to embodiments of the present invention is used by an item management system in which a higher-level device manages items based on terminal IDs transmitted from a plurality of terminals mounted in advance on the items and provides information to a management device, and includes a step in which a plurality of first terminals among the plurality of terminals are each mounted in advance on an item as a management target and each transmit, when vibration is detected by a built-in first acceleration sensor, first vibration data representing the vibration detection and a first terminal ID for identifying the first terminal by radio wave; a step in which a plurality of second terminals among the plurality of terminals are each disposed at a place in a room in which the item is present and each transmit, when vibration is detected by a built-in second acceleration sensor, second vibration data representing the vibration detection and a second terminal ID for identifying the second terminal by radio wave; a step in which the higher-level device includes a storage unit configured to store in advance terminal information related to the first terminal ID and position information related to the second terminal ID, sequentially record each first terminal ID received, a reception time of the received first terminal ID, and the terminal information related to the first terminal ID to a detection list in the storage unit, and sequentially record each second terminal ID received, a reception time of the received second terminal ID, and the position information related to the second terminal ID to the detection list; and a step in which the management device acquires, from the higher-level device, a location list including the terminal information related to the first terminal ID recorded in the detection list and the position information related to the second terminal ID received concurrently with the first terminal ID and displays the location list on a screen.

Effects of Embodiments of the Invention

According to embodiments of the present invention, a management terminal displays, on a screen, terminal information related to terminal IDs wirelessly transmitted from terminals each mounted on an item in response to vibration detection and position information related to beacon IDs wirelessly transmitted from beacon terminals each disposed at a place in a room in which the item is present, or position information related to a terminal ID wirelessly transmitted, in response to vibration detection, from a terminal mounted in advance on an object in the room in which the item is present. Thus, the item at a hidden place can be easily found by directly or indirectly vibrating the item.

BRIEF DESCRIPTION OF THE DRAWINGS

FIG. 13 is a sequence diagram illustrating an item management operation according to the fourth embodiment.

DETAILED DESCRIPTION OF ILLUSTRATIVE EMBODIMENTS

Embodiments of the present invention will be described below with reference to the accompanying drawings.

First Embodiment

Figure 1:
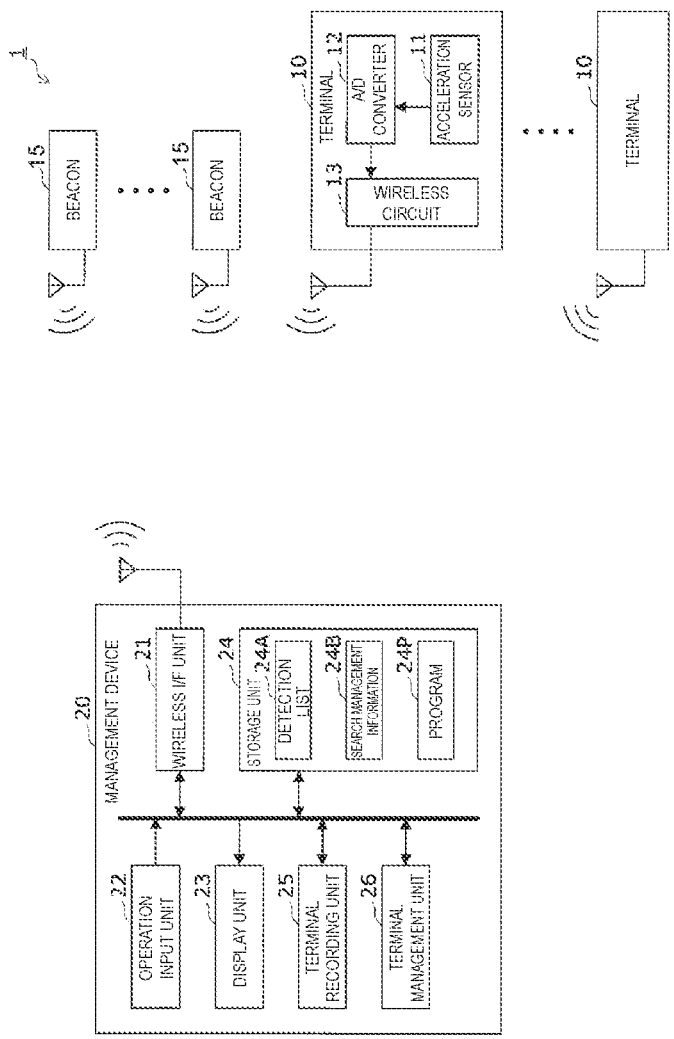
FIG. 1 is a block diagram illustrating the configuration of an item management system according to a first embodiment.

The following first describes an item management system 1 according to a first embodiment of the present invention with reference to FIG. 1. FIG. 1 is a block diagram illustrating the configuration of the item management system according to the first embodiment.

The item management system 1 includes a plurality of first terminals 10 each mounted in advance on an item as a management target and each configured to transmit a unique first terminal ID by radio wave, a plurality of beacon terminals 15 each disposed in advance at a place in a room in which the item is present and each configured to intermittently transmit a beacon signal and a beacon ID by radio wave, and a management device 20 configured to manage the items based on the first terminal IDs and the beacon IDs transmitted from the first terminals 10 and the beacon terminals 15 by radio wave.

Specific examples of the item management system 1 include a brought-item search system configured to search for a brought item lost in a room and a lost-property notification system configured to check whether a user brings a brought item to be brought by the user. The following description will be made on an example in which the item management system 1 is used as the above-described brought-item search system or lost-property notification system.

[Terminal]

The configuration of the first terminals 10 will be first described below in detail with reference to FIG. 1.

Each first terminal 10 is mainly achieved by a small-sized wireless terminal configured to perform wireless communication based on a short-distance wireless communication standard such as Bluetooth Low Energy (BLE; Bluetooth is a registered trademark). The first terminal 10 is, for example, a wireless tag or an RFID tag. As illustrated in FIG. 1, the first terminal 10 includes, as main circuit units, an acceleration sensor 11, an A/D converter 12, and a wireless circuit 13.

The acceleration sensor 11 (first acceleration sensor) has a function to detect vibration of an item on which the first terminal 10 is mounted and output an acceleration signal.

The A/D converter 12 has a function to perform A/D conversion of the acceleration signal from the acceleration sensor 11 into acceleration data and output the acceleration data.

The wireless circuit 13 has a function to detect vibration of the item based on the acceleration data from the A/D converter 12, a function to transmit first vibration data by radio wave in response to the vibration detection, and a function to transmit, when transmitting the first vibration data, the first terminal ID set in advance for identifying the first terminal by radio wave. The first terminal ID may be transmitted as the first vibration data.

[Beacon Terminal]

Each beacon terminal 15 is a typical beacon terminal and a small-sized wireless terminal configured to transmit the beacon signal and the beacon ID by radio wave at a constant period. Each beacon terminal 15 is mounted at a place in the room in which the item is present. The mounting place is, for example, a drawer, a closet, and a storage in each of which the item as a management target is housed, as well as an entrance, a kitchen, a door, a wall, and a pole. Accordingly, a place in the room can be specified based on the beacon ID.

Figures 2, 3:
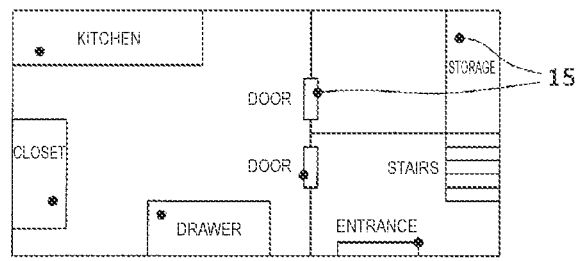
FIG. 2 illustrates an exemplary arrangement of beacon terminals.
FIG. 3 illustrates an exemplary configuration of a detection list.

FIG. 2 illustrates an exemplary arrangement of beacon terminals. In this example, the beacon terminals 15 are disposed at physical bodies such as a drawer, a closet, and a storage in a room, as well as an entrance, a kitchen, and a door.

[Management Device]

Subsequently, the management device 20 will be described below in detail with reference to FIG. 1.

The management device 20 is mainly achieved by an information processing terminal such as a smartphone, a tablet, or a cellular phone. As illustrated in FIG. 1, the management device 20 includes, as main functional components, a wireless I/F unit 21, an operation input unit 22, a display unit 23, a storage unit 24, a terminal recording unit 25, and a terminal management unit 26. The management device 20 is connected to perform data forwarding through an internal bus. Among these functional components, the terminal recording unit 25 and the terminal management unit 26 are achieved through cooperation of a CPU (not illustrated) with a program 24P in the storage unit 24.

The wireless I/F unit 21 has a function to perform data communication with the first terminals 10 and the beacon terminals 15 based on a short-distance wireless communication standard such as BLE.

The operation input unit 22 is achieved by an operation input device such as a touch panel or an operation button and has a function to detect a user operation.

The display unit 23 includes a screen display device such as an LCD and has a function to perform screen display of various kinds of information such as a detection list to be described later.

The storage unit 24 is achieved by a storage device such as a semiconductor memory and has a function to store processing data used for item management processing at the management device 20 and the program 24P.

Main processing data stored in the storage unit 24 includes a detection list 24A and a search management information 24B.

FIG. 3 illustrates an exemplary configuration of the detection list. In this example, the list records sets of the first terminal ID of a first terminal 10 having detected vibration, a reception time at which the first terminal ID transmitted from the first terminal 10 by radio wave is received, and terminal information related to the first terminal ID, and sets of a received beacon ID, a reception time at which the beacon ID is received, and position information related to the beacon ID. The example illustrated in FIG. 3 records reception of the first terminal IDs "0001" and "0002" and the beacon ID "1001" at the same timing of the reception time "7:30".

The terminal information related to each first terminal ID and the position information related to each beacon ID are registered to the search management information 24B in advance. The name of an item as a management target such as a driver's license, a key, an employee ID card, a wallet, or a bag is registered as the terminal information in association with the first terminal ID. The name of a position such as a drawer, a closet, a storage, an entrance, a kitchen, or a door is registered as the position information.

The program 24P is a program read from the storage unit 24 and executed by the CPU when the item management processing is performed at the management device 20. The program 24P is read from an external device or a recording medium (both not illustrated) connected with the management device 20 and is stored in the storage unit 24 in advance. The program 24P may be achieved by a software application executed on a smartphone or a tablet.

The terminal recording unit 25 has two functions described below. The first function is a function performed by the wireless I/F unit 21 to sequentially record, in response to reception of each first vibration data transmitted from a first terminal 10 by radio wave, a first terminal ID received together with the first vibration data and a reception time at which the first terminal ID is received to the detection list 24A in the storage unit 24. The second function is a function performed by the wireless I/F unit 21 to sequentially record, in response to reception of each beacon signal transmitted from a beacon terminal 15 by radio wave, a beacon ID received together with the beacon signal and a reception time at which the beacon ID is received to the detection list 24A in the storage unit 24.

The terminal management unit 26 has a function to acquire, from the search management information 24B at recording of a first terminal ID, at recording of a beacon ID, or in response to a user's check instruction detected by the operation input unit 22, terminal information related to a first terminal ID recorded in the detection list 24A and position information related to a beacon ID received concurrently with the first terminal ID, and display the terminal information and the position information on a screen at the display unit 23.

[Operation in First Embodiment]

Figure 4:
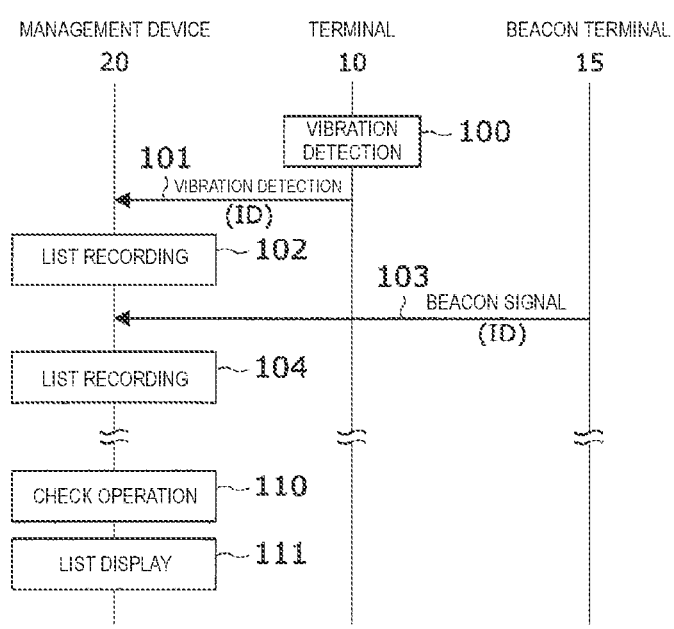
FIG. 4 is a sequence diagram illustrating an item management operation according to the first embodiment.

Subsequently, the operation of the item management system 1 according to the present embodiment will be described below with reference to FIG. 4. FIG. 4 is a sequence diagram illustrating item management operation according to the first embodiment.

The following description will be made on an example in which, when a user having a brought item moves in a room, the position of the brought item is recorded on a smartphone of the user. Assume that an application configured to achieve functions of the management device 20 is installed on the smartphone.

As the user having a brought item moves in the room, vibration is detected by the acceleration sensor 11 of a first terminal 10 (step 100), and first vibration data representing the vibration detection and a first terminal ID are transmitted from the wireless circuit 13 of the first terminal 10 by radio wave (step 101).

In the management device 20, in response to each reception of the first vibration data from the first terminal 10 by the wireless I/F unit 21, the terminal recording unit 25 sequentially records the first terminal ID received together with the first vibration data to the detection list 24A (step 102).

In the management device 20, in response to each reception of a beacon signal from a beacon terminal 15 by the wireless I/F unit 21 (step 103), the terminal recording unit 25 sequentially records a beacon ID received together with the beacon signal to the detection list 24A (step 104).

Thereafter, in the management device 20, when a user's check operation is detected by the operation input unit 22 (step no), the terminal management unit 26 displays, on a screen at the display unit 23, terminal information related to each first terminal ID recorded in the detection list 24A in the storage unit 24 and position information related to a beacon ID received concurrently with the first terminal ID (step 111).

Accordingly, the user can check the movement locus of an item indicated by the terminal information based on the position information, and as a result, can specify the location of the item.

[Effects of First Embodiment]

Accordingly, the present embodiment is as described below. Each terminal 10 is mounted in advance on an item as a management target. When vibration is detected by the built-in acceleration sensor 11, each first terminal 10 transmits first vibration data representing the vibration detection and a first terminal ID for identifying the first terminal by radio wave. Each beacon terminal 15 is disposed in advance at a place in a room in which the item is present. The beacon terminal 15 intermittently transmits a beacon signal and a beacon ID for identifying the beacon terminal 15 by radio wave. The management device 20 sequentially records the first terminal ID received together with each first vibration data and the beacon ID received together with each beacon signal to the detection list 24A in the storage unit 24, acquires, from the storage unit 24, terminal information related to each first terminal ID recorded in the detection list 24A and position information related to a beacon ID received concurrently with the first terminal ID, and displays the terminal information and the position information on a screen.

Accordingly, the first terminal ID transmitted by radio wave from the first terminal 10 mounted on the item brought by the user is recorded to the detection list 24A together with its reception time. In addition, the beacon ID transmitted by radio wave from a beacon terminal 15 disposed at a place to which the user moves is recorded to the detection list 24A together with its reception time. Thus, even when the item is at a place that infrared cannot reach, it is possible to check when the item moves where, in other words, the movement locus of the item by tracing the terminal information related to the first terminal ID and the position information related to each beacon ID, which are recorded to the detection list 24A at the same time. Thus, the item at a hidden place can be easily found.

Second Embodiment

Figure 5:
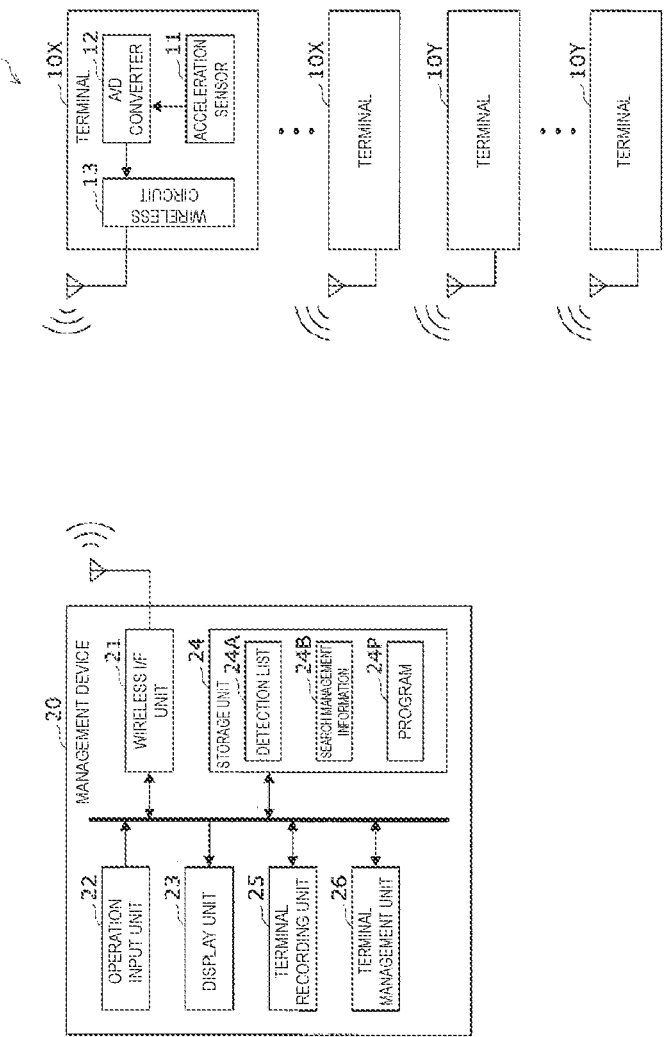
FIG. 5 is a block diagram illustrating the configuration of an item management system according to a second embodiment.

Subsequently, the item management system 1 according to a second embodiment of the present invention will be described below with reference to FIG. 5. FIG. 5 is a block diagram illustrating the configuration of the item management system according to the second embodiment.

The present embodiment describes a case in which, when vibration is detected concurrently by a first terminal 10X mounted on an item and a second terminal 10Y mounted on an object in a room, it is determined that the item and the object are present at substantially the same positions.

Specifically, in the present embodiment, the first terminal 10X and the second terminal 10Y are mainly achieved by small-sized wireless terminals configured to perform wireless communication based on a short-distance wireless communication standard such as BLE, and specific examples thereof include a wireless tag and an RFID tag. As in FIG. 1, the first terminal 10X and the second terminal 10Y each include, as main circuit units, the acceleration sensor 11, the A/D converter 12, and the wireless circuit 13. These functional components are the same as those of the first embodiment, and description thereof is omitted.

Figure 6:
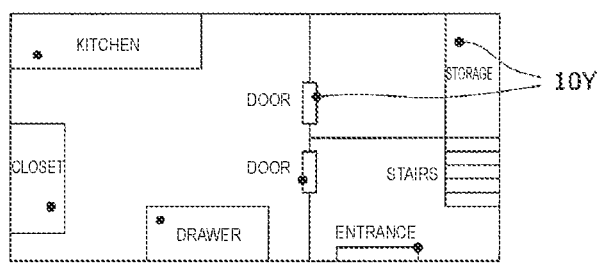
FIG. 6 illustrates an exemplary arrangement of second terminals.

FIG. 6 illustrates an exemplary arrangement of second terminals. In this example, each second terminal 10Y is disposed on an object that vibrates or moves in accordance with a user's operation and motion, such as a drawer, a closet, a storage in a room, an entrance door, a kitchen door, or a door. The configuration of the second terminal 10Y is the same as that of the first terminal 10X illustrated in FIG. 5 except that the acceleration sensor 11 is referred to as a second acceleration sensor, and description thereof is omitted.

In the management device 20, the storage unit 24 has a function to store in advance terminal information related to a first terminal ID and terminal information related to a second terminal ID.

The terminal recording unit 25 has a function to sequentially record a first terminal ID received together with each first vibration data and its reception time to the detection list 24A in the storage unit 24, sequentially record a second terminal ID received together with each second vibration data and its reception time to the detection list 24A, acquire, from the search management information 24B in the storage unit 24, terminal information related to each first terminal ID recorded in the detection list 24A and position information related to a second terminal ID received concurrently with the first terminal ID, and display the terminal information and the position information on a screen at the display unit 23.

[Operation in Second Embodiment]

Figure 7:
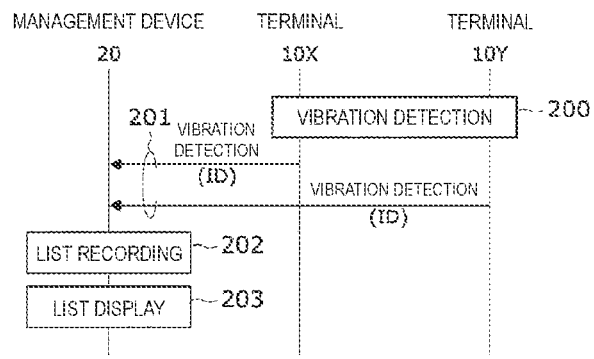
FIG. 7 is a sequence diagram illustrating an item management operation according to the second embodiment.

Subsequently, the operation of the item management system 1 according to the present embodiment will be described below with reference to FIG. 7. FIG. 7 is a sequence diagram illustrating item management operation according to the second embodiment.

The following description will be made on an example, when a user having a brought item moves in a room, the position of the brought item is recorded on a smartphone of the user. Assume that an application configured to achieve functions of the management device 20 is installed on the smartphone.

When a drawer in which a brought item is housed is opened by the user, vibration is detected simultaneously by a first terminal 10X mounted on the brought item (item) and a second terminal 10Y mounted on the drawer (object) (step 200).

Accordingly, first vibration data and a first terminal ID are transmitted from the wireless circuit 13 of the first terminal 10X by radio wave, and second vibration data and a second terminal ID are transmitted from the wireless circuit 13 of the second terminal 10Y by radio wave (step 201).

In the management device 20, in response to reception of each first vibration data by the wireless I/F unit 21, the terminal recording unit 25 sequentially records each first terminal ID received together with the first vibration data and its reception time to the detection list 24A, and in response to reception of each second vibration data by the wireless I/F unit 21, the terminal recording unit 25 sequentially records each second terminal ID received together with the second vibration data and its reception time to the detection list 24A (step 202).

Thereafter, the terminal management unit 26 acquires terminal information related to each first terminal ID and position information related to each second terminal ID, which are recorded in the detection list 24A in the storage unit 24, from the search management information 24B and displays the terminal information and the position information on a screen at the display unit 23 (step 203). The terminal information and the position information may be displayed on the screen when a user's check operation is detected by the operation input unit 22.

Accordingly, the user can check the location of an item indicated by the terminal information based on the position information displayed on the screen.

Figure 8:
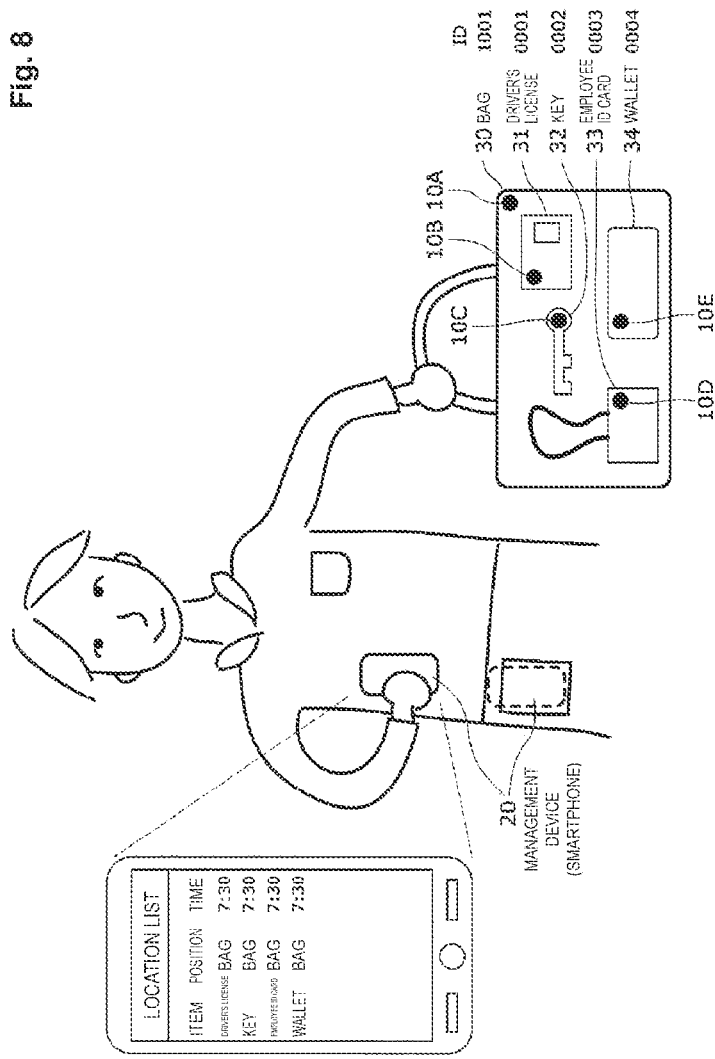
FIG. 8 illustrates an exemplary item location check operation.

FIG. 8 illustrates an exemplary item location check operation. In this example, an employee checks brought items when departing to a company in morning. The brought items are a driver's license 31, a key 32, an employee ID card 33, and a wallet 34 in a bag 30. First terminals 10B, 10C, 10D, and 10E (10X) having first terminal IDs of "0001", "0002", "0003", and "0004" are mounted on the driver's license 31, the key 32, the employee ID card 33, and the wallet 34, respectively. In addition, a second terminal 10A (10Y) having a second terminal ID of "1001" is mounted on the bag 30.

In this case, when the user lifts the bag 30, the first terminals 10B, 10C, 10D and 10E of the driver's license 31, the key 32, the employee ID card 33, and the wallet 34 each detect vibration and transmit first vibration data and the own first terminal ID by radio wave. In addition, the second terminal 10A of the bag 30 detects vibration and transmits second vibration data and the own second terminal ID by radio wave.

A smartphone as the management device 20 records the first terminal ID received together with the first vibration data from each of the first terminals 10B, 10C, 10D, and 10E to the detection list 24A and also records the second terminal ID received together with the second vibration data from the second terminal 10A to the detection list 24A. Then, terminal information related to each first terminal ID, position information related to a concurrently received second terminal ID, and its reception time are acquired from the search management information 24B in the storage unit 24 and displayed on a screen as a location list.

Accordingly, the user can easily check that the driver's license 31, the key 32, the employee ID card 33, and the wallet 34 are in the bag 30 by referring to the location list displayed on the screen at the smartphone.

[Effects of Second Embodiment]

Accordingly, the present embodiment includes a plurality of first terminals 10X each mounted in advance on an item as a management target and each configured to transmit first vibration data representing detected vibration and a first terminal ID by radio wave, and a plurality of second terminals 10Y each mounted on an object in a room in which the item is present and each configured to transmit second vibration data representing detected vibration and a second terminal ID by radio wave, and the management device 20 stores in advance in the storage unit 24, terminal information related to the first terminal ID and position information related to the second terminal ID, sequentially records each first terminal ID received together with the first vibration data and its reception time to the detection list 24A, sequentially records each second terminal ID received together with the second vibration data and its reception time to the detection list 24A, acquires, from the storage unit 24, terminal information related to each first terminal ID recorded in the detection list 24A and position information related to a second terminal ID received concurrently with the first terminal ID, and displays the terminal information and the position information on a screen at the display unit 23.

With this configuration, when the user operates the object, an item housed in, placed on, or locked to the object vibrates in response to vibration of the object. Accordingly, the first terminal ID from a first terminal 10X mounted on the item and the second terminal ID from a second terminal 10Y mounted on the object are concurrently recorded to the detection list 24A. Thus, it is possible to easily check which item is housed in, placed on, or locked to which object by displaying the terminal information related to each first terminal ID and the position information related to each second terminal ID on a screen.

Third Embodiment

Subsequently, the item management system 1 according to a third embodiment of the present invention will be described below.

The present embodiment describes a case in which, in the second embodiment, when vibration is detected simultaneously at a first terminal 10X and a second terminal 10Y, first and second terminal IDs from the first terminal 10X and the second terminal 10Y are recorded to the detection list 24A.

Specifically, in the present embodiment, the terminal recording unit 25 has two functions described below. The first function is a function to compare, at recording of the first and second terminal IDs, a first detection duration in which vibration is detected according to first vibration data DX and a second detection duration in which vibration is detected according to second vibration data DY. The second function is a function to determine whether recording of the first and second terminal IDs to the detection list 24A is permitted based on the length of an overlap duration in which the first and second detection durations overlap each other or the frequency of detection of the overlap duration and sequentially record the first and second terminal IDs to the detection list 24A upon determination that the recording is permitted.

Other configurations of the item management system 1, the first terminal 10X, the second terminal 10Y, and the management device 20 according to the present embodiment are the same as those of the second embodiment, and description thereof is omitted.

Figure 9:
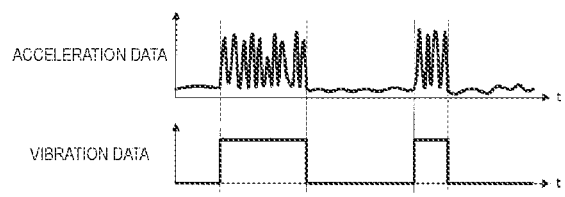
FIG. 9 is a signal waveform diagram illustrating the relation between acceleration data and vibration data.

FIG. 9 is a signal waveform diagram illustrating the relation between acceleration data and vibration data. As illustrated in FIG. 9, the amplitude of the acceleration data (acceleration signal) largely changes with the strength of vibration. Thus, stable vibration data can be obtained by performing threshold processing at the wireless circuit 13 of each of the first terminals 10X and the second terminals 10Y. In the threshold processing, for example, comparison with two of high and low thresholds may be performed and both obtained outputs may be subjected to exclusive OR processing to generate vibration data. The threshold processing of the acceleration data may be performed at the terminal recording unit 25, which can lead to reduction of the number of circuit components and electric power consumption at the first terminals 10X and the second terminals 10Y.

Figure 10:
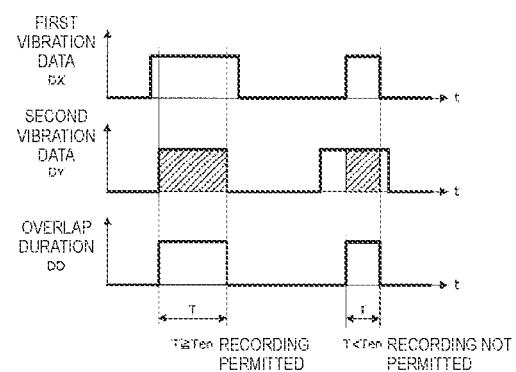
FIG. 10 is a signal waveform diagram illustrating an exemplary comparison between first and second vibration data.

FIG. 10 is a signal waveform diagram illustrating exemplary comparison of the first and second vibration data. As illustrated in FIG. 10, the terminal recording unit 25 performs logic product processing of the first vibration data DX and the second vibration data DY to specify an overlap duration DD in which the first and second detection durations overlap each other. It is determined that terminal ID recording to the detection list 24A is permitted when a time length T of the obtained overlap duration DD of continuous detection is equal to or longer than a determination duration Ten, or it is determined that terminal ID recording to the detection list 24A is not permitted when the time length T of the overlap duration DD is shorter than Ten.

According to the present embodiment, when a first terminal 10X and a second terminal 10Y do not concurrently vibrate, the first terminal ID and the second terminal ID thereof are not recorded to the detection list 24A. Accordingly, the number of times of terminal ID recording to the detection list 24A is reduced, and the number of recorded terminal IDs is reduced. Accordingly, the user can check, in the detection list 24A, only any first terminal 10X and any second terminal 10Y vibrating concurrently with a smartphone as the management device 20 and thus can easily recognize the detection list 24A displayed on a screen.

Figure 11:
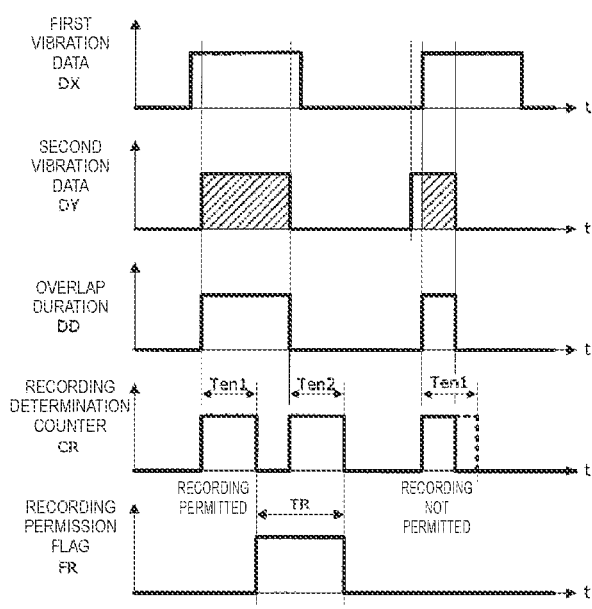
FIG. 11 is a signal waveform diagram illustrating an exemplary comparison (counter) of the first and second vibration data.

The time length T of the overlap duration DD may be determined by using a counter. FIG. 11 is a signal waveform diagram illustrating exemplary comparison (counter) of the first and second vibration data. As illustrated in FIG. 11, a determination duration Ten1 may be measured by using a record determination counter CR configured to operate with a clock signal at a constant frequency. The terminal recording unit 25 activates the record determination counter CR in accordance with the start timing of the overlap duration DD, and determines that terminal ID recording is permitted when the overlap duration DD is continuously detected for a length equal to or longer than the determination duration Ten1 as the record determination counter CR counts up, or determines that terminal ID recording is not permitted when the overlap duration DD is shorter than the determination duration Ten1.

A record permission flag FR indicating whether terminal ID recording to the detection list 24A is permitted may be provided, and whether recording of a received terminal ID is permitted may be checked based on whether the record permission flag FR is in an "on" state indicating that the recording is permitted. In this case, the terminal recording unit 25 measures a determination duration Ten2 by the record determination counter CR, and when it is determined that the terminal ID recording is permitted as described above, the terminal recording unit 25 sets the record permission flag FR to the "on" state, starts count operation by the record determination counter CR at the end timing of the overlap duration DD, and sets the record permission flag FR to an "off" state when elapse of the determination duration Ten2 is checked as the record determination counter CR counts up.

Accordingly, a record permission duration TR is a duration until the determination duration Ten2 of a certain length elapses since it is checked that the overlap duration DD is continuously detected for a length equal to or longer than the determination duration Ten1. Thus, only when a terminal ID is received concurrently with the overlap duration DD, the terminal ID is recorded to the detection list 24A, which achieves more stable terminal ID record processing.

The terminal management unit 26 may delete a terminal ID from the detection list 24A when a record expiration time set in advance has elapsed since recording of the terminal ID to the detection list 24A. Accordingly, a terminal ID recorded in the past is not displayed on a screen, which makes it easy for the user to recognize the detection list 24A displayed on the screen.

Although the above description is made on a case in which permission of terminal ID recording is determined based on the length of the overlap duration DD of the first vibration data DX and the second vibration data DY, permission of terminal ID recording may be determined based on a detection frequency DN of the overlap duration DD in a constant detection time.

In this case, a determination frequency DNth may be set in advance, the detection frequency DN may be counted based on the start timing of the overlap duration DD, and it may be determined that terminal ID recording is permitted when the detection frequency DN becomes equal to or higher the determination frequency DNth.

Accordingly, a first terminal ID and a second terminal ID are recorded to the detection list 24A only after, for example, vibration is detected three times (DNth=3) in a constant detection time concurrently with the management device 20. Thus, the frequency of terminal ID recording to the detection list 24A is reduced, and the number of recorded terminal IDs is reduced. Accordingly, the user can easily recognize the detection list 24A displayed on a screen.

An illuminance sensor may be provided to each first terminal 10X and each second terminal 10Y, illuminance data detected by the illuminance sensor may be transmitted by radio wave like acceleration data, and the terminal management unit 26 of the management device 20 may record brightness change at the first terminal 10X and the second terminal 10Y and the time of the change to the storage unit 24.

Accordingly, the time of brightness change around an item and an object can be checked, and for example, the time at which the item is put in a bag can be estimated based on the time at which the brightness at the item significantly decreases.

Fourth Embodiment

Figure 12:
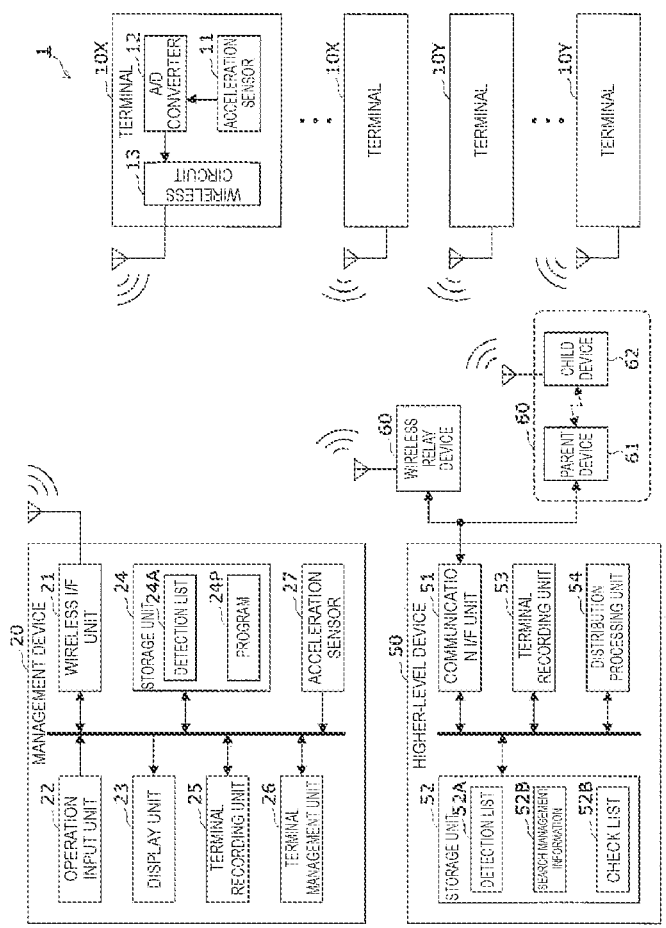
FIG. 12 is a block diagram illustrating the configuration of an item management system according to a fourth embodiment.

Subsequently, the item management system 1 according to a fourth embodiment of the present invention will be described below with reference to FIG. 12. FIG. 12 is a block diagram illustrating the configuration of the item management system according to the fourth embodiment.

In the present embodiment, a higher-level device 50 is provided separately from the management device 20, records a first terminal ID from each first terminal 10X and a second terminal ID from each second terminal 10Y to a detection list 52A, and provides information related to a first terminal 10X mounted on an item by distributing a location list generated from the detection list 52A to the management device 20.

[Higher-Level Device]

Subsequently, the configuration of the higher-level device 50 according to the present embodiment will be described below in detail with reference to FIG. 12.

The higher-level device 50 is mainly achieved by an information processing device such as a server device and includes, as main functional components, a communication I/F unit 51, a storage unit 52, a terminal recording unit 53, and a distribution processing unit 54, and these functional components are connected with each other to perform data forwarding through an internal bus. Among these functional components, the terminal recording unit 53 and the distribution processing unit 54 are achieved through cooperation of a CPU with a program (both not illustrated).

The communication I/F unit 51 has a function to perform data communication with the first terminals 10X and the second terminals 10Y through a wireless relay device 60 based on a short-distance wireless communication standard such as BLE, and a function to perform data communication with the management device 20 through the wireless relay device 60 based on a short-distance wireless communication standard such as BLE or based on a wireless communication standard such as Wi-Fi (recorded trademark).

The storage unit 52 is achieved by a storage device such as a hard disk or a semiconductor memory and has a function to store processing data and programs used for the item management processing at the higher-level device 50.

Main processing data stored in the storage unit 52 includes the detection list 52A. As in the detection list 24A in FIG. 2 described above, the detection list 52A records pairs of a first terminal ID transmitted by radio wave from a first terminal 10X having detected vibration and its reception time. The detection list 24A also records pairs of a second terminal ID transmitted by radio wave from a second terminal 10Y having detected vibration and its reception time.

The terminal recording unit 53 has a function to compare a first detection duration in which vibration is detected according to first vibration data transmitted from a first terminal 10X by radio wave and received by the communication I/F unit 51 through the wireless relay device 60 and a second detection duration in which vibration is detected according to second vibration data transmitted from a second terminal 10Y by radio wave, determine whether recording of a first terminal ID and a second terminal ID to the detection list 52A is permitted based on the length of an overlap duration in which the first and second detection durations overlap each other or the frequency of detection of the overlap duration, and sequentially record the first terminal ID and the second terminal ID to the detection list 52A in accordance with determination that the recording is permitted.

The terminal recording unit 53 may transmit, by radio wave, management-side vibration data representing vibration detected by an acceleration sensor 27 at the management device 20 and may use, as the above-described overlap duration, a management-side detection duration in which vibration is detected according to the management-side vibration data and a duration in which the first detection duration and the second detection duration overlap each other.

The distribution processing unit 54 has a function to acquire terminal information related to a first terminal ID and position information related to a second terminal ID, which are registered in pairs in the detection list 52A, from search management information 52B in the storage unit 52 in response to a distribution request from the management device 20 and provide information by distributing a location list of the obtained terminal information and position information to the management device 20.

In addition, the distribution processing unit 54 has a function to collate, in response to a collation request from the management device 20, a first terminal ID included in the detection list 52A in the storage unit 52 and a first terminal ID included in a check list 52C stored in the storage unit 52 and provide information by distributing an obtained collation result to the management device 20, and a function to, when collating the first terminal ID included in the detection list 52A, search past detection lists stored in the storage unit 52 for a detection list corresponding to the date and time or day of week of the detection list 52A of the current day and generate a check list 52C from a first terminal ID, a record rate of which is a probability equal to or higher than a predetermined value among first terminal IDs recorded in the obtained detection list.

The wireless relay device 60 has a function to accommodate the first terminals 10X, the second terminals 10Y, and the management device 20 through wireless lines and relay-connect the first terminals 10X, the second terminals 10Y, and the management device 20 to the higher-level device 50, a function to measure a standard time synchronized with a time management server (not illustrated) by accessing the time management server through a communication network, and a function to, when relay-forwarding terminal IDs transmitted from the first terminals 10X and the second terminals 10Y by radio wave to the higher-level device 50, notify the higher-level device 50 of the standard time at the relay-forwarding as the reception times of the terminals ID. Accordingly, the area of accommodation of the first terminals 10X, the second terminals 10Y, and the management device 20 can be significantly increased without degrading the accuracy of the reception times.

The wireless relay device 60 may include a parent device 61 and a child device 62 connected with each other through a wireless relay line. In this case, the child device 62 has a function to accommodate the first terminals 10X, the second terminals 10Y, and the management device 20 and relay-connect the first terminals 10X, the second terminals 10Y, and the management device 20 to the parent device 61 through the wireless relay line. The parent device 61 has a function to relay-connect, to the higher-level device 50, the first terminals 10X, the second terminals 10Y, and the management devices 20 relay-connected through the child device 62 and when notifying the higher-level device 50 of reception times, correct the reception times based on a delay time through the wireless relay line, which is obtained through measurement in advance, and then notify the higher-level device 50 of the corrected reception times. Accordingly, the area of accommodation of the first terminals 10X, the second terminals 10Y, and the management device 20 can be significantly increased without degrading the accuracy of the reception times.

[Operation in Fourth Embodiment]

Subsequently, the operation of the item management system 1 according to the present embodiment will be described below with reference to FIG. 13. FIG. 13 is a sequence diagram illustrating item management operation according to the fourth embodiment.

The following description will be made on an example in which, when a user having a bag in which a plurality of brought items are stored departs, these brought items are checked on a smartphone of the user. Assume that a first terminal 10X is mounted on each brought item in advance, and a second terminal 10Y is mounted on the bag in advance, and an application configured to achieve functions of the management device 20 is installed on the smartphone.

When the user lifts the bag in which the brought items are stored, vibration of the brought items is detected by the acceleration sensors 11 of the first terminals 10X and the second terminal 10Y (step 300), and first vibration data representing the vibration detection and the own terminal IDs are transmitted at once from the wireless circuits 13 of the first terminals 10X and the second terminal 10Y by radio wave (step 301).

The higher-level device 50 receives first vibration data from the first terminals 10X and second vibration data from the second terminal 10Y through the wireless relay device 60 by the communication I/F unit 51, and compares a first detection duration in which vibration is detected according to the first vibration data and a second detection duration in which vibration is detected according to the second vibration data.

As a result of the comparison, whether terminal ID recording to the detection list 52A is permitted is determined based on the length of an overlap duration in which the first and second detection durations overlap each other or the frequency of detection of the overlap duration, and the first terminal ID and second terminal ID are sequentially recorded to the detection list 52A in accordance with determination that the recording is permitted (step 302).

The generation of vibration data from acceleration data (acceleration signal) and the threshold processing at the first terminals 10X and the second terminal 10Y are the same as those in FIG. 9 described above. The threshold processing of the acceleration data of the first terminals 10X and the second terminal 10Y may be performed at the terminal recording unit 53, which can lead to reduction of the number of circuit components and electric power consumption at the first terminals 10X and the second terminal 10Y.

The comparison of the first vibration data and the second vibration data and the recording permission determination at the terminal recording unit 53 are the same as those in FIGS. 10 and 11 described above.

After the recording of the first terminals 10X and the second terminal 10Y, the distribution processing unit 54 acquires the detection list 52A from the storage unit 52, acquires terminal information related to each first terminal ID and position information related to each second terminal ID from search management information 52B, and distributes a location list of the obtained terminal information and position information from the communication I/F unit 51 to the management device 20 through the wireless relay device 60 (step 303).

The terminal management unit 26 of the management device 20 receives the location list from the higher-level device 50 through the wireless I/F unit 21 and displays the location list on a screen at the display unit 23 (step 304).

In response to a user's collation instruction detected by the operation input unit 22 (step 310), the terminal management unit 26 of the management device 20 transmits a collation request related to the detection list 52A to the higher-level device 50 through the wireless I/F unit 21 by radio wave (step 311). Each beacon terminal may be installed at a predetermined place such as a gateway, and the terminal management unit 26 may transmit the collation request by radio wave when a beacon signal from the beacon terminal is received by the management device 20. Accordingly, ID collation can be automatically performed when the user has moved to a particular place.

In response to the collation request from the management device 20, which is received by the communication I/F unit 51 through the wireless relay device 60, the distribution processing unit 54 of the higher-level device 50 collates each first terminal ID included in the detection list 52A and each first terminal ID included in the check list 52C stored in the storage unit 52 (step 312), and distributes an obtained collation result to the management device 20 (step 313).

The terminal management unit 26 of the management device 20 receives the collation result from the higher-level device 50 and gives notification of the collation result in a visible, audible, or vibrating manner (step 314).

Accordingly, as described above, each of terminal IDs transmitted from the first terminals 10X of the brought items and the second terminal 10Y upon vibration at departure and recorded in the detection list 52A is collated with each terminal ID in the check list 52C in response to the collation request from the management device 20.

Accordingly, when a terminal ID in the check list 52C is not recorded in the detection list 52A, a brought item corresponding to the terminal ID is a forgotten item. Thus, when a collation result indicates that a terminal ID not recorded in the detection list 52A is found, an alert is emitted from the display unit 23 of the management device 20 in a visible, audible, or vibrating manner so that the user can immediately recognize a forgotten item. Accordingly, a lost-property notification system can be achieved by the item management system 1.

When collating a terminal ID in the detection list 52A, the distribution processing unit 54 of the higher-level device 50 may search past detection lists stored in the storage unit 52 for a detection list corresponding to the date and time or day of week of the detection list 52A of the current day and may select the detection list as the check list 52C.

Accordingly, for example, the detection list 52A of the previous day can be selected as the check list 52C of the current day, which can reduce a work load required for setting of the check list 52C.

According to the present embodiment, when the management device 20 does not vibrate concurrently with a first terminal 10X and a second terminal 10Y in a case in which management-side vibration data is used, terminal IDs from the first terminal 10X and the second terminal 10Y are not recorded to the detection list 52A. Thus, the frequency of terminal ID recording to the detection list 52A is reduced, and the number of recorded terminal IDs is reduced. Accordingly, the user can check, in the detection list 52A, only any first terminal 10X and any second terminal 10Y vibrating concurrently with a smartphone as the management device 20, and can easily recognize the detection list 52A displayed on a screen.

In addition, according to the present embodiment, the detection list 52A is collated with the check list 52C, and thus, when a terminal ID in the check list 52C is not recorded in the detection list 52A, a brought item corresponding to the terminal ID is a forgotten item. Thus, when a collation result indicates that a terminal ID not recorded in the detection list 52A is found, an alert is emitted from the display unit 23 of the management device 20 in a visible, audible, or vibrating manner so that the user can immediately recognize a forgotten item. Accordingly, a lost-property notification system can be achieved by the item management system 1.

When collating a terminal ID in the detection list 52A, the terminal recording unit 53 may search past detection lists stored in the storage unit 52 for a detection list corresponding to the date and time or day of week of the detection list 52A of the current day and may select the detection list as the check list 52C.

Accordingly, for example, the detection list 52A of the previous day can be selected as the check list 52C of the current day, which can reduce a work load required for setting of the check list 52C.

When the detection list 52A of the previous day is selected as the check list 52C, brought items of the current day are collated with those of the previous day, and thus it is possible to easily check a brought item that is brought on the previous day but not brought the current day, in other words, a forgotten item. Accordingly, an employee departing to a company can check brought items such as a wallet and an employee ID card, or a worker departing to a job site can check brought items such as gears and tools.

When the detection list 52A of the previous week is selected as the check list 52C, brought items of the current day are collated with those of the previous week, and thus it is possible to easily check a brought item that is brought in the previous week but not brought on the current day, in other words, a forgotten item. Accordingly, when departing to a lesson on a particular day of week, a learner can check brought items used in the lesson.

[Extension of Embodiments]

The present invention is described above with reference to embodiments but not limited to the above-described embodiments. Configurations and specifications of the present invention may be provided with various changes that could be understood by the skilled person in the art within the scope of the present invention. In addition, the embodiments may be optionally combined without inconsistency.

REFERENCE SIGNS LIST 1 item management system
10, 10X, 10B, 10C, 10D, 10E first terminal
10Y, 10A second terminal
11 acceleration sensor
12 A/D converter
13 wireless circuit
15 beacon terminal
20 management device
21 wireless I/F unit
22 operation input unit
23 display unit
24 storage unit
24A detection list
24B search management information
24C check list
24P program
25 terminal recording unit
26 terminal management unit
27 acceleration sensor
30 bag
31 driver's license
32 key
33 employee ID card
34 wallet
50 higher-level device
51 communication I/F unit
52 storage unit
52A detection list
52B search management information
52C check list
53 terminal recording unit
54 distribution processing unit
60 wireless relay device
61 parent device
62 child device

The invention claimed is:

1. An item management system comprising:
at least one first terminal on an item as a management target, each first terminal configured to transmit a first terminal ID for identifying the first terminal by radio wave when a first vibration is detected by a first built-in acceleration sensor;
at least one second terminal on an object in a room in which the item is present, each second terminal configured to transmit a second terminal ID for identifying the second terminal by radio wave when a second vibration is detected by a second built-in acceleration sensor; and
a management device including a storage unit, the management device configured to:
store in advance terminal information related to the first terminal ID and position information related to the second terminal ID;
sequentially record each first terminal ID received and a reception time of the first terminal ID received to a detection list in the storage unit;
sequentially record each second terminal ID received and a reception time of the second terminal ID received to the detection list;
acquire, from the storage unit, the terminal information related to the first terminal ID recorded in the detection list and the position information related to the second terminal ID received concurrently with the first terminal ID; and
display the terminal information and the position information on a screen.

2. The item management system according to claim 1, wherein:
the at least one first terminal is configured to transmit first vibration data representing the first vibration by radio wave in a duration in which the first vibration is detected;
the at least one second terminal is configured to transmit second vibration data representing the second vibration by radio wave in a duration in which the second vibration is detected; and
at recording of the first and the second terminal IDs, the management device is configured to:
compare a first detection duration in which the first vibration is detected according to the first vibration data and a second detection duration in which the second vibration is detected according to the second vibration data; and
determine whether recording of the first and the second terminal IDs to the detection list is permitted based on a length of an overlap duration in which the first and the second detection durations overlap each other or a frequency of detection of the overlap duration.

3. The item management system according to claim 2, wherein, at recording of the first and the second terminal IDs, only when the first and the second terminal IDs are received until a record permission duration of a certain length elapses from a check that the length of the overlap duration has reached a determination duration set in advance, the management device is configured to record the received first and the second terminal IDs to the detection list.

4. An item management system comprising:
at least one first terminal on an item as a management target, each first terminal configured to transmit a first terminal ID for identifying the first terminal by radio wave when a first vibration is detected by a first built-in acceleration sensor;
at least one second terminal on an object in a room in which the item is present, each second terminal configured to transmit a second terminal ID for identifying the second terminal by radio wave when a second vibration is detected by a second built-in acceleration sensor;
a higher-level device including a storage unit, the higher-level device configured to store in advance terminal information related to the first terminal ID and position information related to the second terminal ID, sequentially record each first terminal ID received, a reception time of the received first terminal ID, and the terminal information related to the first terminal ID to a detection list in the storage unit, and sequentially record each second terminal ID received, a reception time of the received second terminal ID, and the position information related to the second terminal ID to the detection list; and
a management device configured to acquire, from the higher-level device, a location list including the terminal information related to the first terminal ID recorded in the detection list and the position information related to the second terminal ID received concurrently with the first terminal ID and display the location list on a screen.

5. The item management system according to claim 4, wherein
the first terminal is configured to transmit first vibration data representing the first vibration by radio wave in a duration in which the first vibration is detected;
the second terminal is configured to transmit second vibration data representing the second vibration by radio wave in a duration in which the second vibration is detected; and
at recording of the first and the second terminal IDs, the higher-level device is configured to compare a first detection duration in which the first vibration is detected according to the first vibration data and a second detection duration in which the second vibration is detected according to the second vibration data, and determine whether recording of the first and the second terminal IDs to the detection list is permitted based on a length of an overlap duration in which the first and the second detection durations overlap each other or a frequency of detection of the overlap duration.

6. The item management system according to claim 4, wherein the management device is configured to transmit a collation request related to the detection list to the higher-level device in response to a collation instruction input through an operation and give notification of a collation result as information provided from the higher-level device in response to the collation request in a visible, audible, or vibrating manner.

7. The item management system according to claim 6, wherein the higher-level device is configured to collate a first terminal ID included in the detection list and a first terminal ID included in a check list stored in the storage unit in response to the collation request from the management device and provide information of an obtained collation result to the management device, and when performing the collation, the higher-level device is configured to search past detection lists stored in the storage unit for a detection list corresponding to date and time or day of week of the detection list and generate the check list from a first terminal ID, a record rate of which is a probability equal to or higher than a predetermined value among first terminal IDs recorded in the obtained detection list.

8. The item management system according to claim 4, further comprising a wireless relay device configured to accommodate the first and the second terminals and the management device through wireless lines and perform relay connection of the first and the second terminals and the management device to the higher-level device.

9. The item management system according to claim 8, wherein:
the wireless relay device is configured to measure a standard time synchronized with a time management server, and when relay-forwarding the first and the second terminal IDs to the higher-level device, the wireless relay device is configured to notify the higher-level device of the standard time at the relay-forwarding as the reception times of the first and the second terminal IDs; and
at recording of the first and the second terminal IDs, the higher-level device is configured to record, to the detection list, the reception times of the first and the second terminal IDs and be notified by the wireless relay device.

10. The item management system according to claim 9, wherein:
the wireless relay device includes a parent device and a child device connected with each other through a wireless relay line,
the child device is configured to accommodate the first and the second terminals or the management device and relay-connect the first and the second terminals or the management device to the parent device through the wireless relay line; and
the parent device is configured to relay-connect, to the higher-level device, the first and the second terminals or the management device relay-connected through the child device, and when notifying the higher-level device of the reception times, the parent device is configured to correct the reception times based on a delay time through the wireless relay line, which is obtained through measurement in advance, and then notify the higher-level device of the corrected reception times.

11. An item management method comprising:
a step in which at least one first terminal among a plurality of terminals is mounted in advance on an item as a management target and transmits a first terminal ID for identifying the first terminal by radio wave when vibration is detected by a built-in acceleration sensor;
a step in which at least one beacon terminal among the plurality of terminals is disposed in advance at a place in a room in which the item is present and intermittently transmits a beacon ID for identifying the beacon terminal by radio wave; and
a step in which a management device including a storage unit stores terminal information related to each first terminal ID and position information related to each beacon ID, sequentially records each first terminal ID received and a reception time of the received first terminal ID to a detection list in the storage unit, sequentially records each beacon ID received and a reception time of the received beacon ID to the detection list, acquires, from the storage unit, the terminal information related to the first terminal ID recorded in the detection list and the position information related to the beacon ID received concurrently with the first terminal ID, and displays the terminal information and the position information on a screen.

12. The item management method according to claim 11, wherein:

the at least one first terminal transmits first vibration data representing the vibration by radio wave in a duration in which the vibration is detected;

the at least one beacon terminal transmits second vibration data representing a second vibration by radio wave in a duration in which the second vibration is detected; and at recording of the first and the beacon terminal IDs, the management device compares a first detection duration in which the first vibration is detected according to the first vibration data and a second detection duration in which the second vibration is detected according to the second vibration data, and determines whether recording of the first and the beacon terminal IDs to the detection list is permitted based on a length of an overlap duration in which the first and the second detection durations overlap each other or a frequency of detection of the overlap duration.

13. The item management method according to claim 12, wherein, at recording of the first and the beacon terminal IDs, only when the first and the beacon terminal IDs are received until a record permission duration of a certain length elapses from a check that the length of the overlap duration has reached a determination duration set in advance, the management device records the received first and the beacon terminal IDs to the detection list.

\* \* \* \* \*